(12) United States Patent
Francis

(10) Patent No.: US 12,237,104 B2
(45) Date of Patent: Feb. 25, 2025

(54) SURFACE-MOUNTED MAGNETIC-COMPONENT MODULE

(71) Applicant: Murata Manufacturing Co., Ltd., Nagaokakyo (JP)

(72) Inventor: Lee Francis, Milton Keynes (GB)

(73) Assignee: MURATA MANUFACTURING CO., LTD., Kyoto (JP)

( * ) Notice: Subject to any disclaimer, the term of this patent is extended or adjusted under 35 U.S.C. 154(b) by 598 days.

(21) Appl. No.: 16/924,670

(22) Filed: Jul. 9, 2020

(65) Prior Publication Data

US 2021/0012948 A1 Jan. 14, 2021

Related U.S. Application Data

(60) Provisional application No. 62/871,851, filed on Jul. 9, 2019.

(51) Int. Cl.
| | | |
|---|---|---|
| *H01F 27/28* | (2006.01) | |
| *H01F 27/02* | (2006.01) | |
| *H01F 27/06* | (2006.01) | |
| *H01F 27/24* | (2006.01) | |
| *H01F 41/02* | (2006.01) | |
| *H01F 41/04* | (2006.01) | |
| *H01F 41/12* | (2006.01) | |
| *H02M 5/458* | (2006.01) | |
| *H02P 27/04* | (2016.01) | |

(52) U.S. Cl.
CPC ....... *H01F 27/2804* (2013.01); *H01F 27/022* (2013.01); *H01F 27/06* (2013.01); *H01F 27/24* (2013.01); *H01F 41/0206* (2013.01); *H01F 41/041* (2013.01); *H01F 41/127* (2013.01); *H02M 5/458* (2013.01); *H02P 27/04* (2013.01)

(58) Field of Classification Search
CPC .................................................. H01F 27/2804
USPC .......................................................... 336/229
See application file for complete search history.

(56) References Cited

U.S. PATENT DOCUMENTS

| | | | | | |
|---|---|---|---|---|---|
| 4,777,465 | A | * | 10/1988 | Meinel | H01L 23/642 336/200 |
| 6,246,311 | B1 | * | 6/2001 | Finnemore | H01F 17/062 336/83 |
| 2009/0160595 | A1 | * | 6/2009 | Feng | H01L 23/49861 336/200 |
| 2009/0160596 | A1 | * | 6/2009 | Yang | H01F 27/2895 336/208 |
| 2012/0146755 | A1 | * | 6/2012 | Shao | H01F 17/062 336/182 |
| 2014/0159853 | A1 | * | 6/2014 | Yang | H01F 5/00 336/221 |
| 2015/0061817 | A1 | * | 3/2015 | Lee | H01F 17/0013 336/221 |

(Continued)

OTHER PUBLICATIONS

Francis, "Surface-Mounted Magnetic-Component Module", U.S. Appl. No. 17/568,853, filed Jan. 5, 2022.

(Continued)

*Primary Examiner* — Ronald Hinson
(74) *Attorney, Agent, or Firm* — Keating & Bennett, LLP

(57) ABSTRACT

A magnetic-component module includes a substrate, a header on the substrate, a core, a winding including a trace on the header, and an overmold material encapsulating the header, the core, and the trace.

11 Claims, 12 Drawing Sheets

(56) References Cited

U.S. PATENT DOCUMENTS

2016/0254090 A1* 9/2016 Lloyd ................. H01F 27/2804
336/200
2019/0057942 A1* 2/2019 Male ................... H01L 23/4952

OTHER PUBLICATIONS

Francis, L. et al. "Surface-Mounted Magnetic-Component Module,", PCT Application No. PCT/US2020/041355, filed Jul. 9, 2020.

* cited by examiner

SURFACE-MOUNTED MAGNETIC-COMPONENT MODULE

CROSS REFERENCE TO RELATED APPLICATIONS

This application claims the benefit of U.S. Patent Application No. 62/871,851 filed on Jul. 9, 2019. The entire contents of this application are hereby incorporated by reference.

BACKGROUND OF THE INVENTION

1. Field of the Invention

The present invention relates to magnetic components and magnetic-component modules, and in particular, to transformers and surface-mounted transformer modules.

2. Background

Transformers are used in many applications, for example, to change the voltage of input electricity. A transformer has one or more primary windings and one or more secondary windings wound around a common core of magnetic material. The primary winding(s) receive electrical energy, such as from a power source, and couples this energy to the secondary winding(s) by a changing magnetic field. The energy appears as an electromagnetic force across the secondary winding(s). The voltage produced in the secondary winding(s) is related to the voltage in the primary winding(s) by the turns ratio between the primary and secondary windings. Typical transformers are implemented using an arrangement of adjacent coils. In a toroidal transformer, the windings wind around a toroid-shaped core.

Demands in many fields, including telecommunications, implantable medical devices, and battery-operated wireless devices, for example, have prompted design efforts to minimize the size of components with lower-cost solutions that exhibit the same or better performance but operate with reduced power consumption. The reduced power consumption is often prompted by further requirements in lowering supply voltages to various circuits. Accordingly, there is a continuing need to provide more efficient, smaller, and lower cost transformers.

SUMMARY OF THE INVENTION

To overcome the problems and satisfy the needs described above, preferred embodiments of the present invention provide magnetic-component modules each including a header on a substrate, and a winding including a trace on the header.

According to a preferred embodiment of the present invention, a magnetic-component module includes a substrate; a header on the substrate; a core; a winding including a trace on the header; and an overmold material encapsulating the header, the core, and the trace.

The magnetic-component module can further include a first wire bond electrically connected to the header and the substrate. The magnetic-component module can further include a second wire bond extending over the core and electrically connecting a first portion of the substrate and a second portion of the substrate.

A first pad of the header can be electrically connected to the substrate. A second pad of the header can be connected to a host substrate.

Electrical components can be attached to a second surface of the substrate that is opposite to the first surface of the substrate that includes the header. The header can include a surface mount pad that extends between the header and the substrate.

According to a preferred embodiment of the present invention, a method of manufacturing a magnetic-component module includes providing a core; overmolding the core to define a header; patterning metal on the header to define windings around the core; providing a substrate including traces on and/or in the substrate and including a surface-mount pad on a first surface of the substrate; mounting the header on the first surface of the substrate; connecting the windings and the traces with wire bonds; and overmolding the header, the wire bonds, and the surface-mount pad with overmold material.

The method can further include attaching electrical components to a second surface of the substrate that is opposite to the first surface of the substrate. The method can further include mounting input/output pins on the substrate. The input/output pins can be exposed on the second surface of the substrate. The header can include a conductive pad that is not covered with the overmold material.

According to a preferred embodiment of the present invention, a voltage converter circuit includes the magnetic-component module according to one of the various preferred embodiments of the present invention.

According to a preferred embodiment of the present invention, a gate drive switching circuit includes the voltage converter circuit according to one of the various preferred embodiments of the present invention.

According to a preferred embodiment of the present invention, a motor control circuit includes the gate drive switching circuit according to one of the various preferred embodiments of the present invention.

The above and other features, elements, characteristics, steps, and advantages of the present invention will become more apparent from the following detailed description of preferred embodiments of the present invention with reference to the attached drawings.

DETAILED DESCRIPTION OF PREFERRED EMBODIMENTS

Figure 1A:
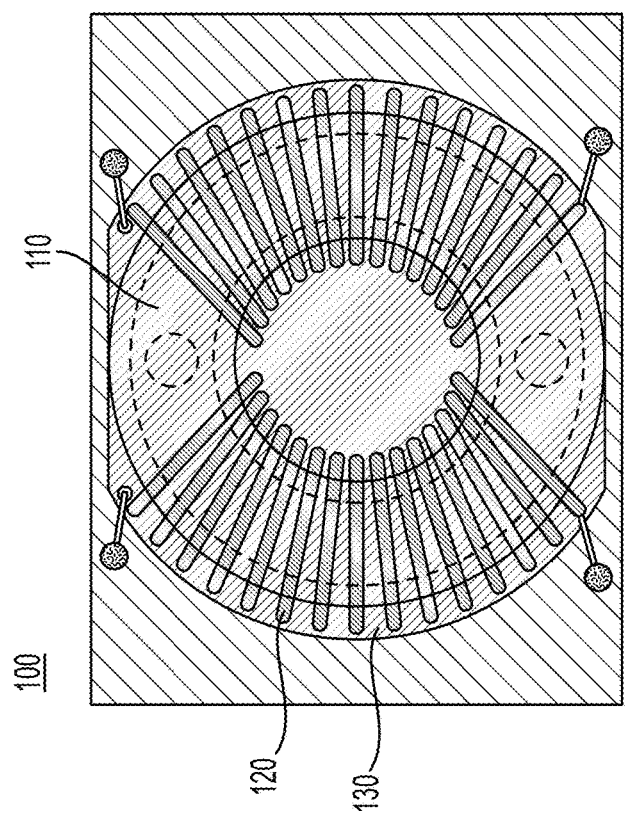
FIGS. 1A and 1B show a magnetic-component module with a header with plated traces according to a preferred embodiment of the present invention.
Figure 1B:
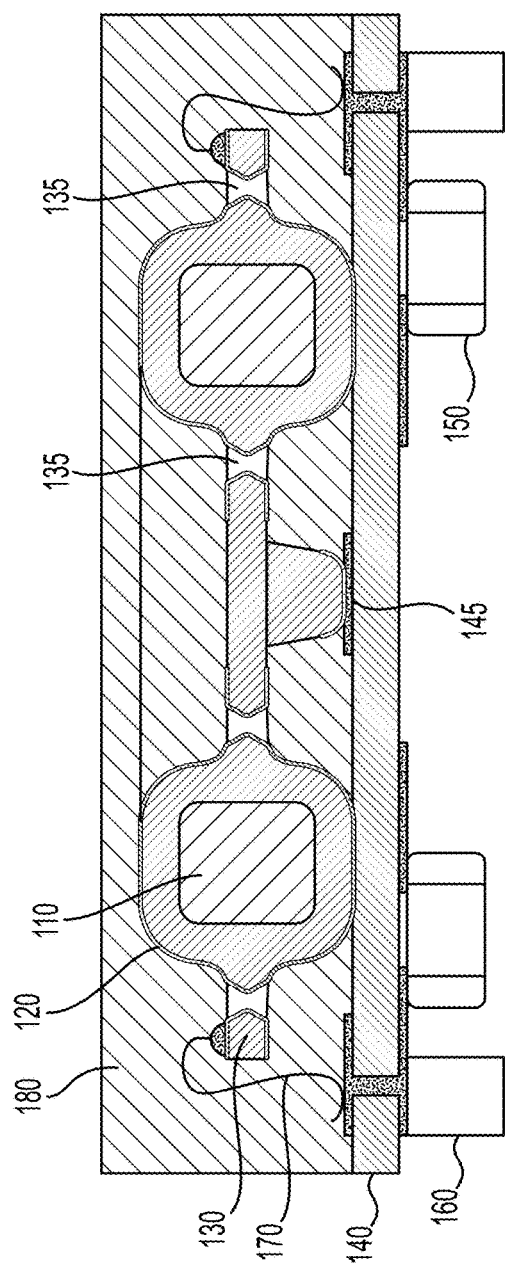

FIGS. 1A and 1B show a magnetic-component module 100 with a core 110, winding(s) 120, a header 130, and a substrate 140 such as a printed circuit board (PCB). FIG. 1B is a cross-section view of the magnetic-component module 100, and FIG. 1A is a plan view of the header 130 that can be made by overmolding the core 110. In FIG. 1A, the outline of the core 110 is shown by the dashed lines. The magnetic-component module 100 can be a transformer with primary and secondary windings that extend around the core 110, as shown in FIG. 1. Although FIG. 1 shows a transformer with two windings, other magnetic components can also be used, including, for example, an inductor with a single winding or a transformer with three or more windings. Circuitry components 150 and/or connectors can be located on the bottom surface of the substrate 140. As shown in FIG. 1, the magnetic-component module 100 can include surface-mount (SM) pins 160 that can also be located on the bottom surface of the substrate 140. The circuitry components 150 can include passive components, such as, capacitors, resistors, etc. and can include active components, such as transistors. Although FIG. 1B shows a substrate 140 with no internal layers, it is also possible to use a multilayer substrate.

The header 130 isolates the core 110 from the windings 120 and protects against short circuiting. Windings 120 extend around the core 110 and are defined by traces located on the outer surface of the header 130 and located in vias 135 extending through the header 130. The traces defining the windings 120 can be provided by plating, vapor deposition, or any other suitable process. Wire bonds 170 can be used to connect the traces on the header 130 to pads on the substrate 140. In FIG. 1, the tops and bottoms of the windings 120 are defined by the traces that extend around the core 110. But other arrangements are also possible. For example, the tops of the windings 120 can be defined by traces on the header 130, and the bottoms of the windings 120 can be defined by traces on or in the substrate 140. The traces in the substrate 140 can be connected to the traces on the header 130 by the wire bonds 170 and/or by including surface-mount pads (not shown) on the header 130.

The header 130 can include an outer ledge and an inner ledge. The vias 135 can be included in the outer and inner ledge. The vias 135 can be arranged in one or more rows in the outer and the inner ledges. The center of the header 130 can include a conductive pad that extends from the inner ledge and that can be used to place and mount the header 130 to a surface-mount pad 145 on the substrate 140. The conductive pad on the header 130 can be soldered to the surface-mount pad 145 on the substrate 140. Other possible arrangements to mount the header 130 to the substrate 140 can also be used.

FIG. 1 also shows that the header 130 and wire bonds 170 can be overmolded with an overmold material 180 to stabilize and protect the components of the magnetic-component module 100. Instead of overmolding, it is also possible to use a potting method or an encapsulation method to stabilize and protect the components of the magnetic-component module 100.

Figure 2A:
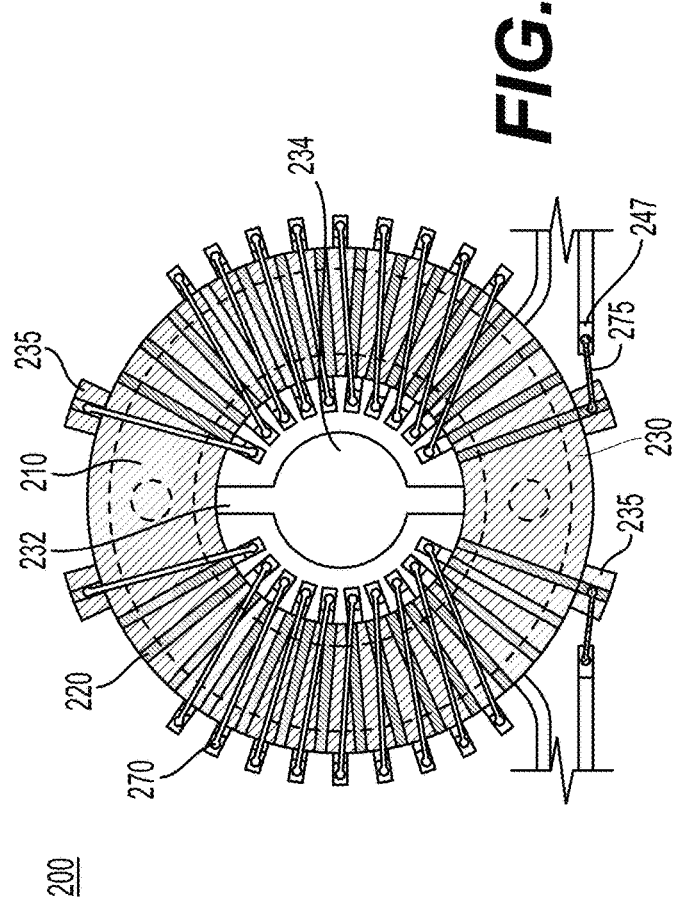
FIGS. 2A and 2B show a magnetic-component module with a header with plated traces and wire bonds according to a preferred embodiment of the present invention.
Figure 2B:
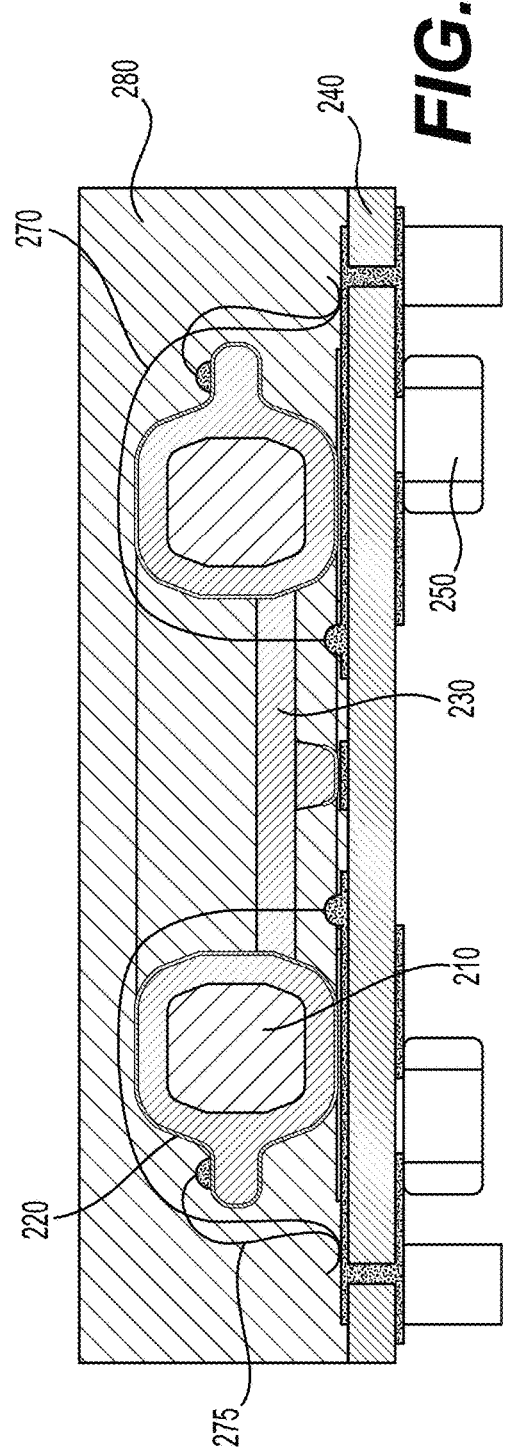

FIGS. 2A and 2B show another magnetic-component module 200 with a core 210, winding(s) defined by traces 220 and wire bonds 270, a header 230, and a substrate 240. FIG. 2B is a sectional view of a magnetic-component module 200 with a header 230, and FIG. 2A shows a plan view of the header 230. In FIG. 2A, the outline of a core 210 is represented by the dashed lines. The header 230 isolates the core 210 from the windings and protects against short circuiting. As shown in FIG. 2B, circuitry components 250 and/or connectors can be located on the bottom surface of a substrate 240. Like FIG. 1, FIG. 2 also shows that the header 230 and wire bonds 270 can be overmolded with overmold material 280. Although FIG. 2B shows a substrate 240 with no internal layers, it is also possible to use a multilayer substrate.

Windings extend around the core 210. The windings are defined by traces 220 located on the outer surface of the header 230 and by wire bonds 270 extending over the core 230 and traces 220 located on or in the substrate 240. The header 230 in FIG. 2 does not include any vias that extend through the header 230. The traces 220 on the header 230 can define a winding separate from the winding defined by the wire bonds 270 and the traces on or in the substrate 240. Alternatively, the traces 220 on the header 230, the wire bonds 270, and the traces on or in the substrate 240 can define a single winding. Furthermore, the direction of the windings defined by the traces 220 can be the same or different than the windings defined by the wire bonds 270.

The header 230 can include outer ledges 235. FIG. 2A shows four outer ledges 235, but any number of outer ledges can be used. A continuous outer ledge could be used but would require longer traces on the header 230 and more room to attach the wire bonds 270 to the substrate 240. Wire bonds 275 can be bonded to the outer ledges 235 to connect the traces 220 on header 230 to a pad or traces 247 on the substrate 240. The outer ledges 235 can also provide a location to connect the wire bonds 270 of the windings with the traces 220 of the windings. The interior of the header 230 can include a platform 234 attached to the header 230 by two arms 232. The two arms 232 can be arranged and the platform 234 can be designed small enough to allow the wire bonds 270 of the windings to be bonded in the interior of the header 230. The platform 234 can be used for pick-and-place placement. The platform 234 can include a conductive pad that can be used to surface mount the header 230 to the substrate 240. The conductive pad of the header 230 can be soldered to the substrate 240. Other possible arrangements to mount the header 230 to the substrate 240 can also be used.

The wire bonds 270 can be terminated in a single row or multiple rows. As shown in FIG. 2A, the wire bonds 270 can be terminated to the substrate 240 in single rows in the exterior and the interior of the core 230. Other arrangements are also possible. For example, the wired bonds 270 can be terminated to the substrate 240 in two or more rows in the exterior of the core 210 and/or can be terminated to the substrate 240 in two or more rows in the interior of the core 210.

Figure 3:
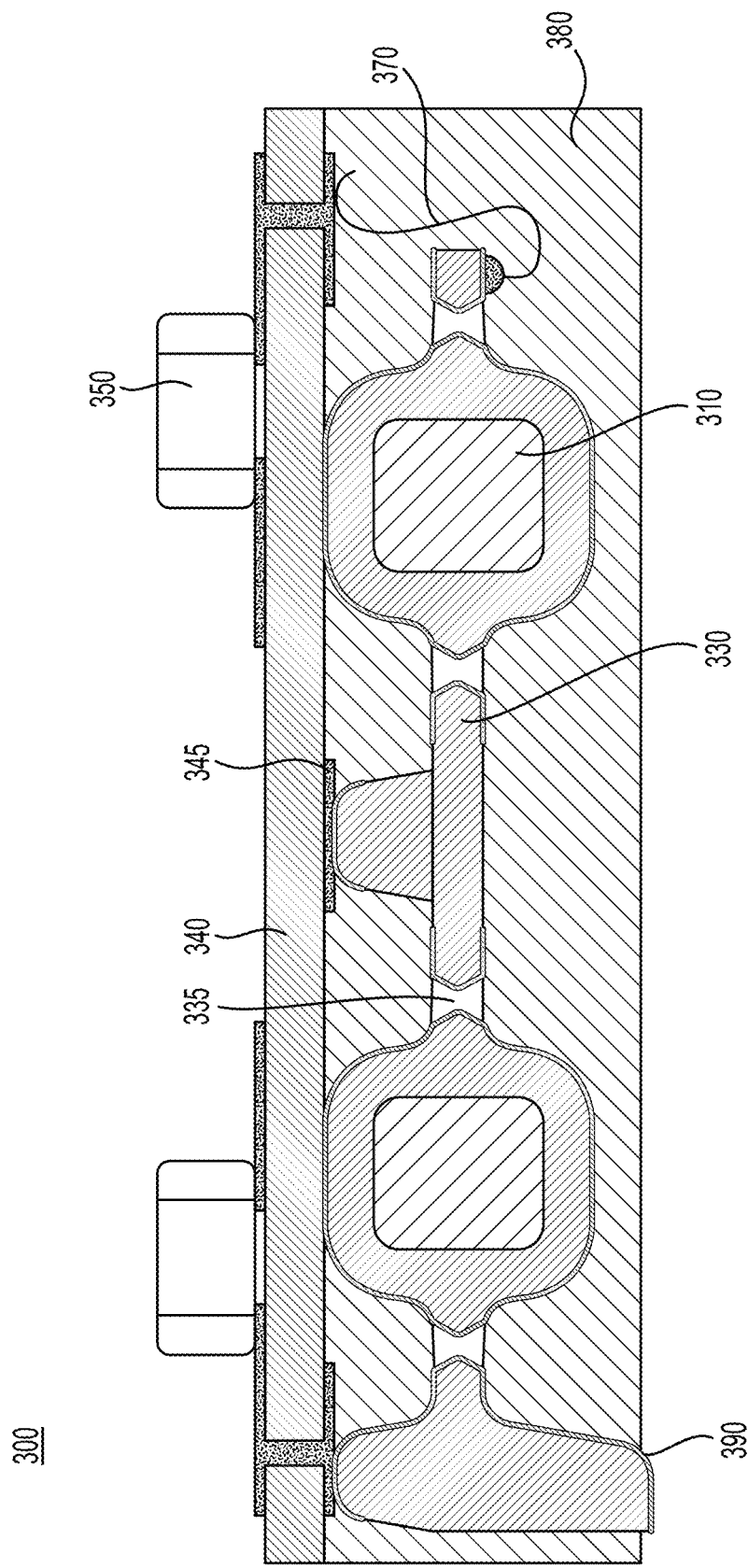
FIG. 3 shows a magnetic-component module with a header with pinout and/or substrate connections according to a preferred embodiment of the present invention.

FIG. 3 is a sectional view of the magnetic-component module 300 with a header 330 overmolding a core 310 where the magnetic-component module 300 includes conductive pads 390 that can electrically connect the header 330 directly to surface-mount pads on a host substrate (not shown) without any additional connection wires. The header 330 can be made by overmolding the core 310 and includes vias 335 arranged around the exterior and the interior of the core 310. Circuitry components 350 can be located on the top surface of a substrate 340. FIG. 3 also shows that the header 330 and wire bonds 370 connecting the header 310 to the substrate 340 can be overmolded with overmold material 380. Although FIG. 3 shows a substrate 340 with no internal layers, it is also possible to use a multilayer substrate.

Similar to that shown in FIG. 2, windings extend around the core 310 and are defined by traces located on the outer surface of the header 330 and located in the vias 335 extending through the header 310. As shown in FIG. 3, wire bonds 370 can connect the traces on the header 330 and the substrate 340. Instead of or in addition to the wire bonds 370, an outer edge portion of the header 330 can include a conductive pad that is connected to a corresponding surface-mount pad 345 on the substrate 340. The header 330 can also include another pad or pads that can be connected to the host substrate. Alternatively, the header 330 can be shaped to engage with a corresponding connector on the host substrate.

Figure 4:
FIGS. 4-13 show steps of a method of manufacturing the magnetic-component module of FIG. 1.
Figure 5:
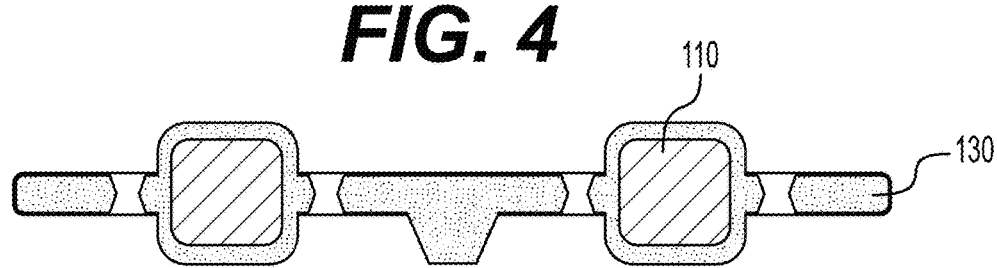
Figure 6:
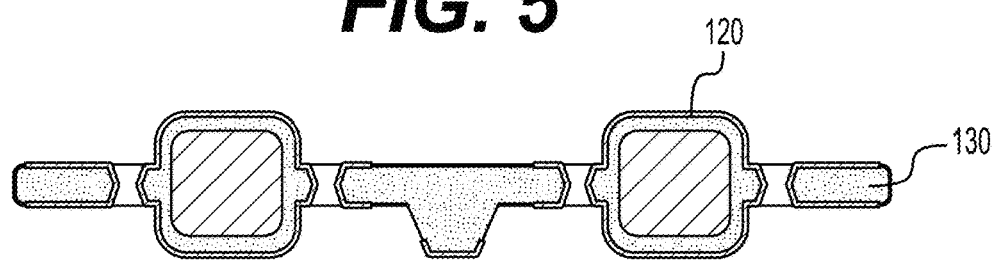
Figure 7:
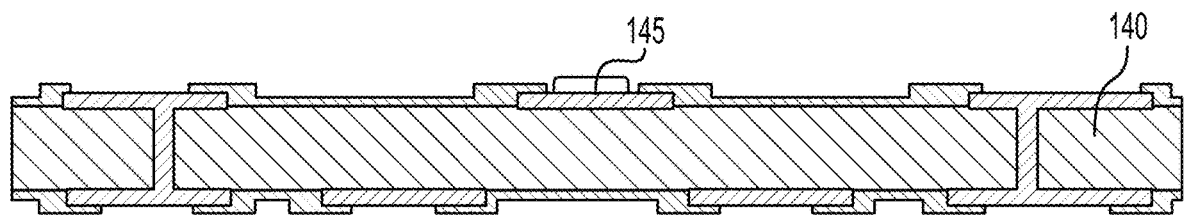
Figure 8:
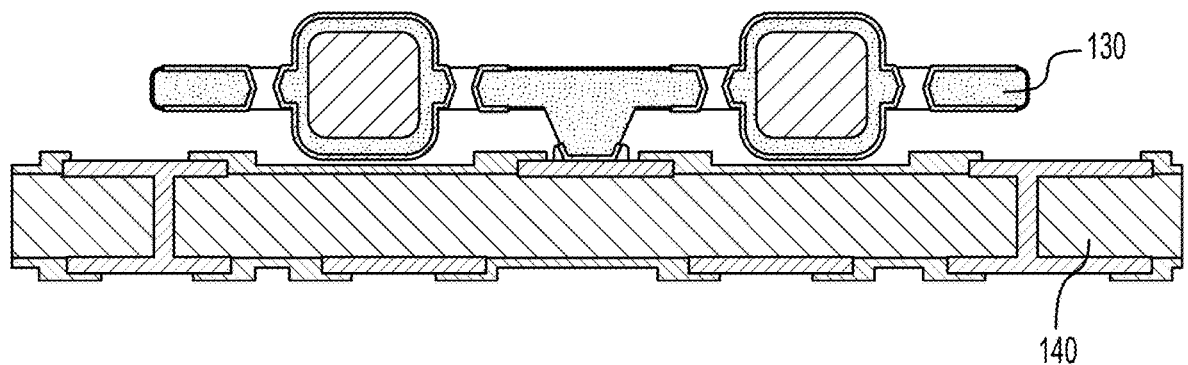
Figure 9:
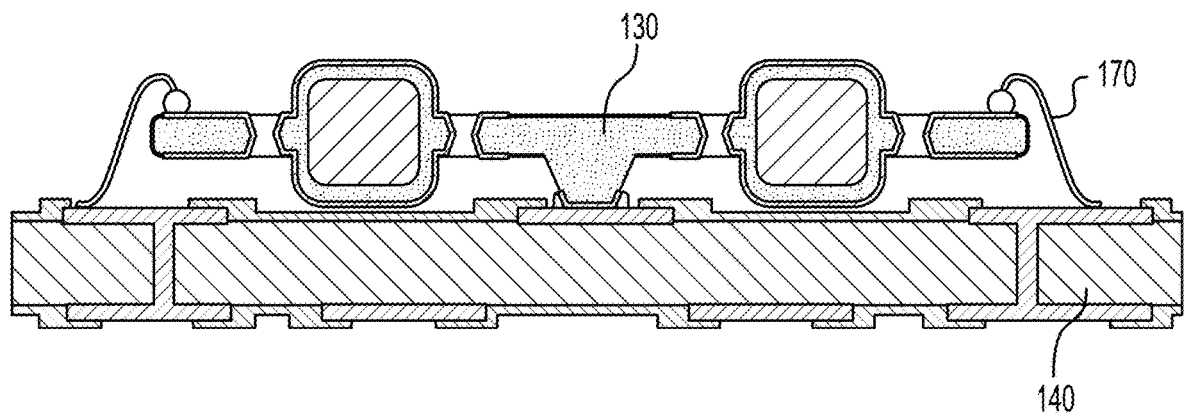
Figure 10:
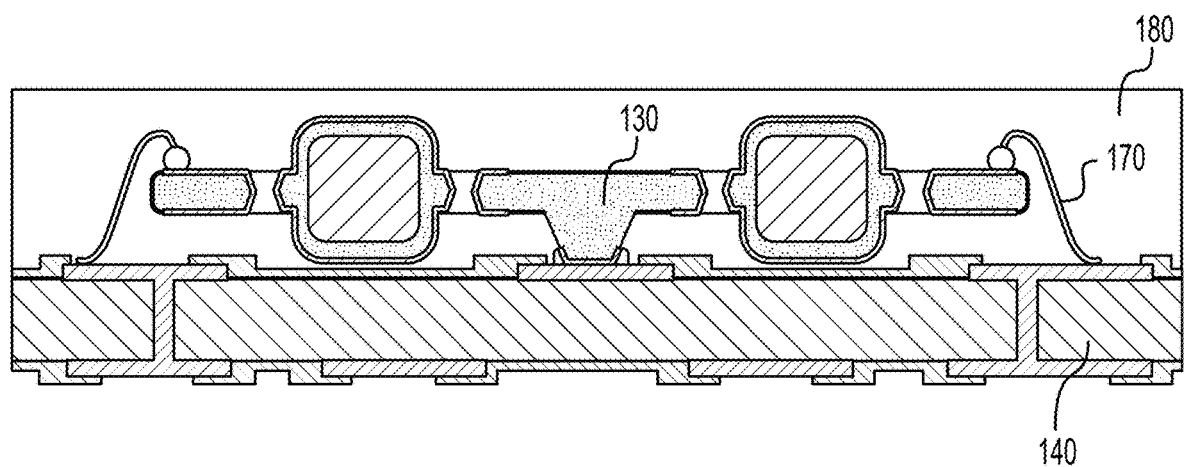
Figure 11:
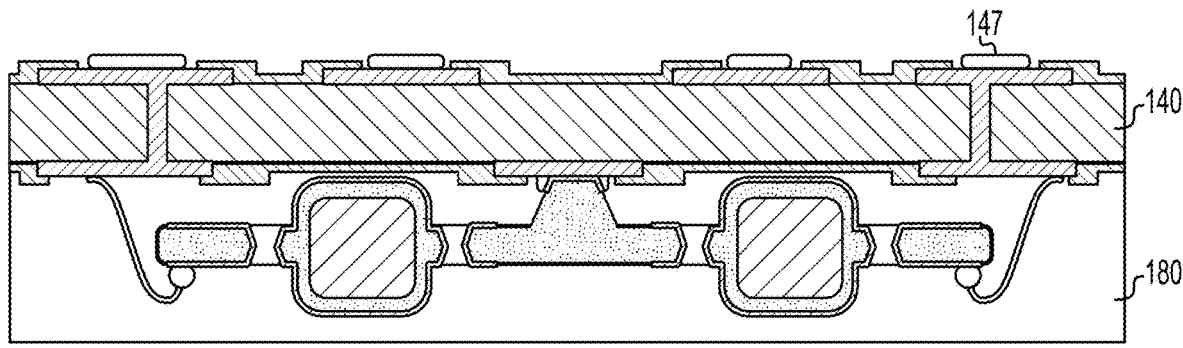
Figure 12:
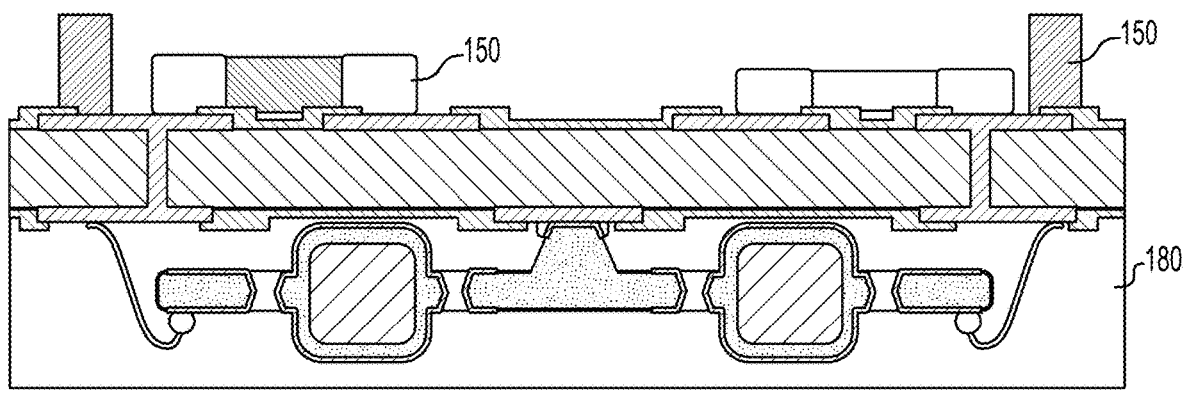
Figure 13:
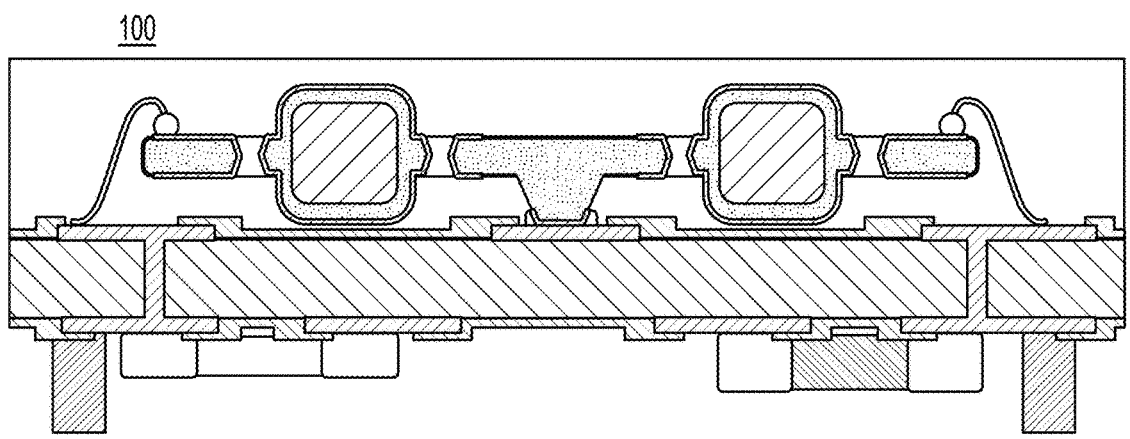

FIGS. 4-13 show steps of a method of manufacturing the magnetic-component module 100 shown in FIG. 1. FIG. 4 shows providing the ring core 110. FIG. 5 shows that the ring core 110 can be overmolded with a resin to form the header 130. FIG. 6 shows that the header 130 can be plated on top and bottom to form traces for the windings 120. FIG. 7 shows that the substrate 140, such as a PCB, can be provided with traces and the surface-mount pad 145 on outer surfaces according to conventional techniques. FIG. 8 shows that the header 130 can be mounted by adhering or soldering the header 130 into place on the substrate 140. FIG. 9 shows that the wire bonds 170 can be formed between the header 130 and the substrate 140. FIG. 10 shows that an overmold material 180 can be overmolded to cover or encapsulate the header 130 and the wire bonds 170 on one side of the substrate 140. FIG. 11 shows that solder 147 can be deposited on the substrate 140 on the opposite surface to the overmold material 180. FIG. 12 shows that the components 150 and the I/O pins 160 can be mounted on the substrate 140 using the solder 147. FIG. 13 shows the finished magnetic-component module 100 shown in FIG. 1.

The magnetic component module 200 can be made in a similar manner, except that the header provided in FIG. 5 can include no vias, the substrate provided in FIG. 6 can have traces to define the windings, and additional wire bonding can be provided in FIG. 9 provides wire bonds 270 to define the windings.

Figure 14:
FIGS. 14-22 show steps of a method of manufacturing the magnetic-component module of FIG. 3.
Figure 15:
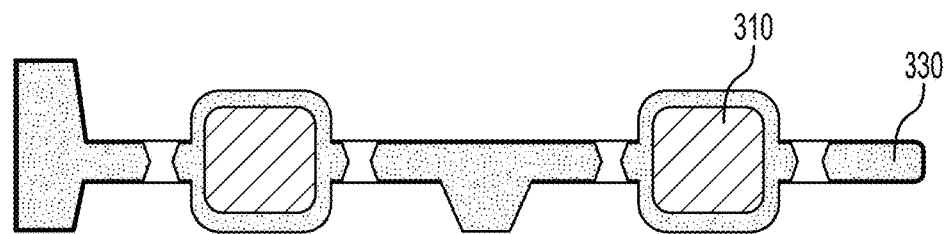
Figure 16:
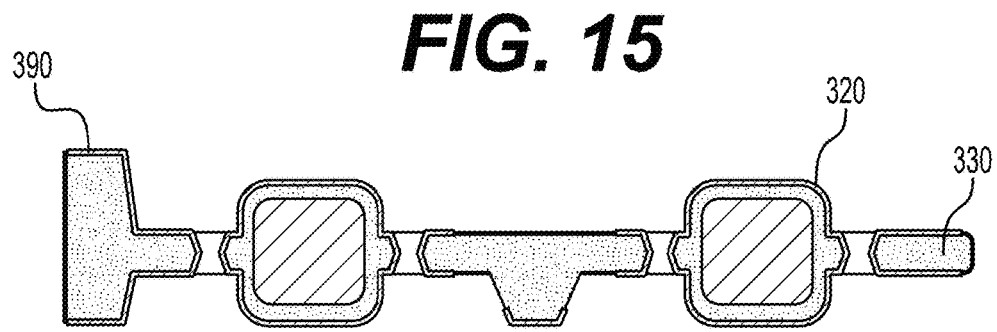
Figure 17:
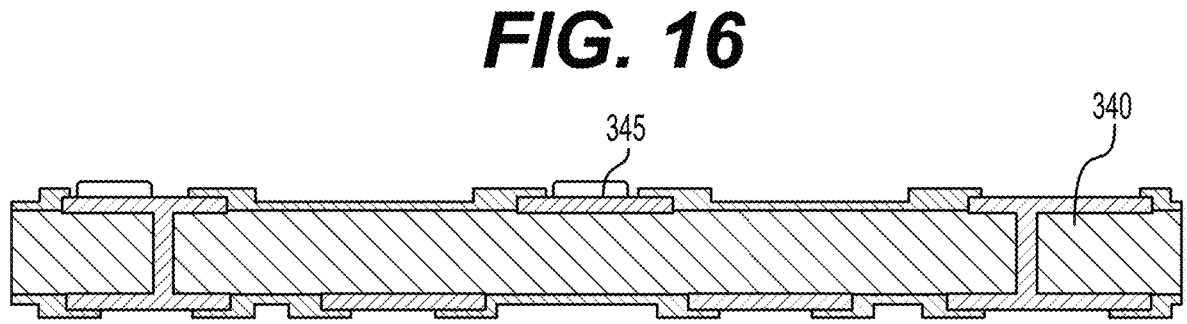
Figure 18:
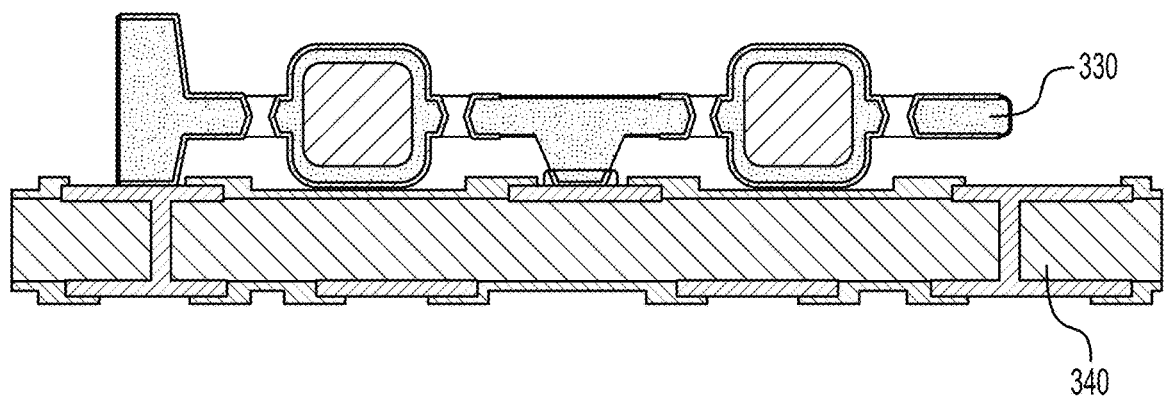
Figure 19:
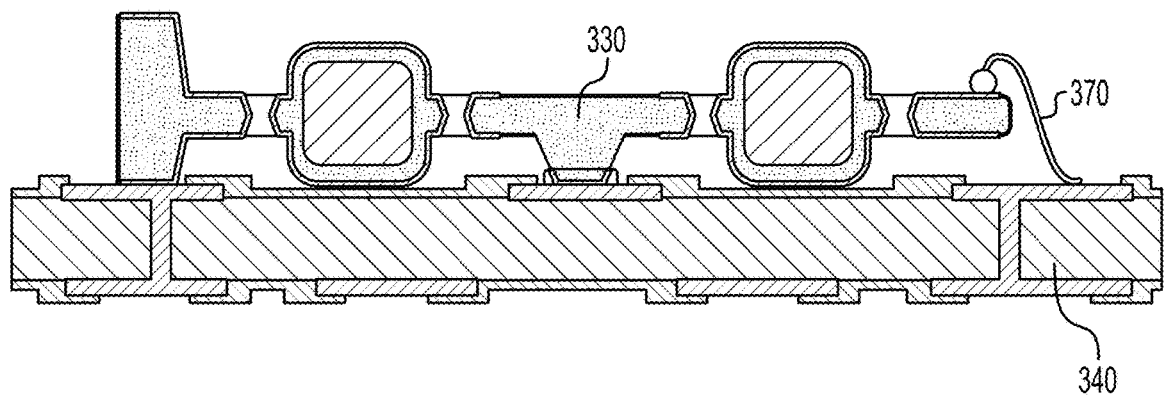
Figure 20:
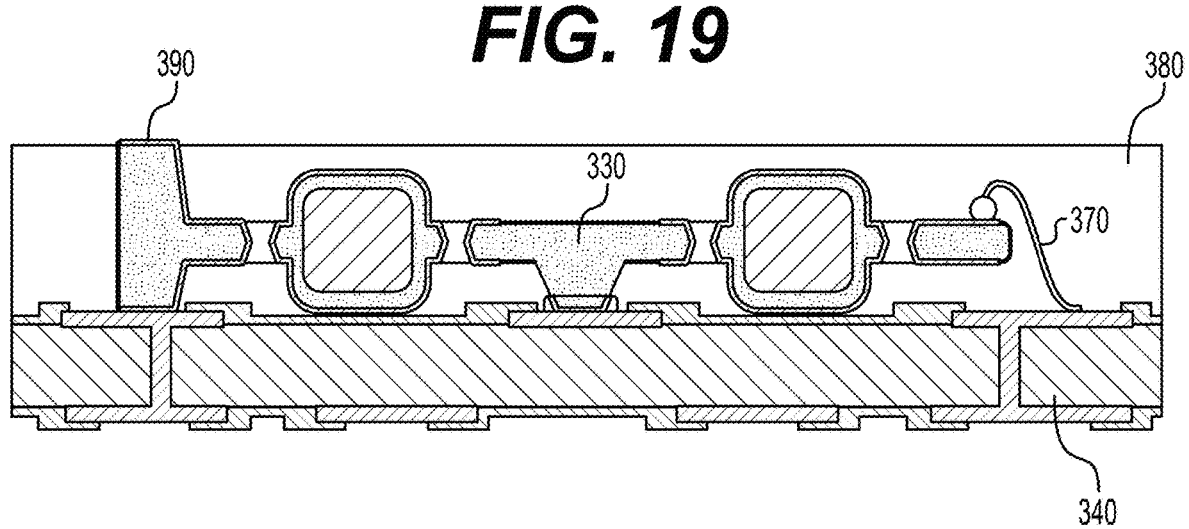
Figure 21:
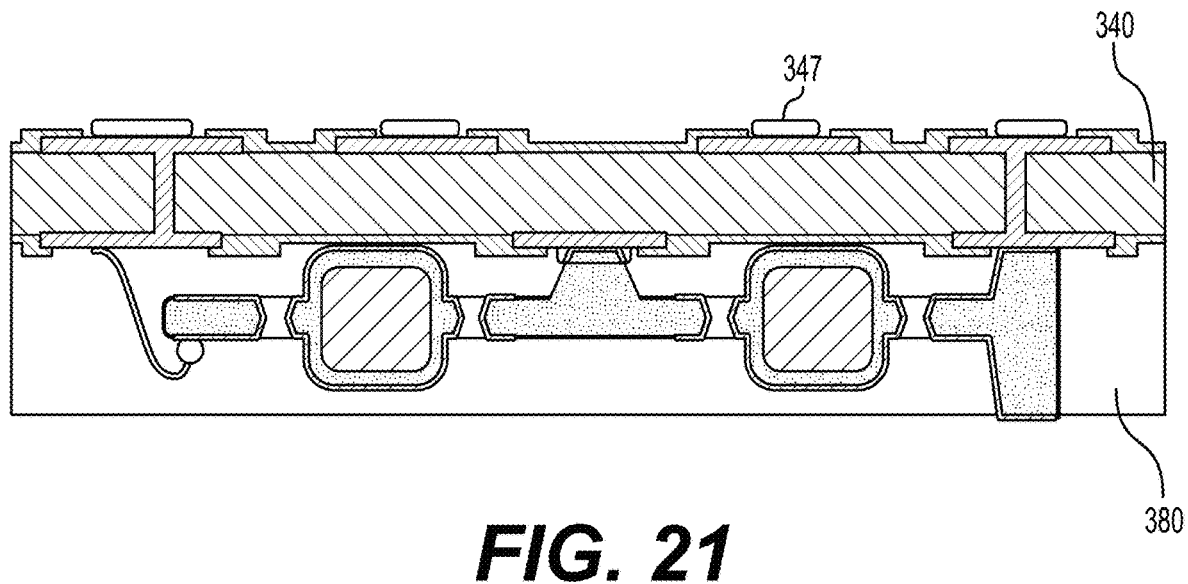
Figure 22:
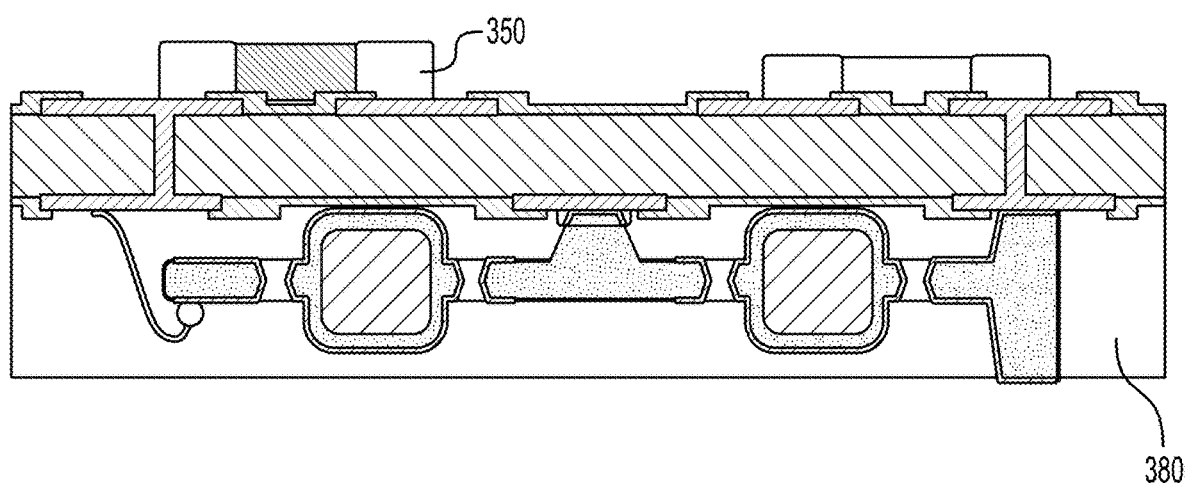

As described above with respect to FIG. 3, the magnetic-component module 300 includes conductive pads 390 that can electrically connect the header 330 directly to surface-mount pads on a host substrate (not shown) without any additional connection wires. FIGS. 14-22 show steps of a method of manufacturing the magnetic-component module 300 shown in FIG. 3. FIG. 14 shows providing the ring core 310. FIG. 15 shows that the ring core 310 can be overmolded with a resin to form the header 330. FIG. 16 shows that the header 330 can be plated on top and bottom surfaces to form traces for the windings 320 and form the conductive pad 390. FIG. 17 shows that the substrate 340, such as a PCB, can be provided with traces and the surface-mount pad 345 on outer surfaces according to conventional techniques. FIG. 18 shows that the header 330 can be mounted by adhering or soldering the header 330 into place on the substrate 340. FIG. 19 shows that the wire bonds 370 can be formed between the header 330 and the substrate 340. FIG. 20 shows that an overmold material 380 can be overmolded to cover or encapsulate the header 330 and the wire bonds 370 on one side of the substrate 340, while leaving the conductive pad 390 exposed. FIG. 21 shows that solder 347 can be deposited on the substrate 340 on the opposite surface to the overmold material 380. FIG. 22 shows that the components 350 can be mounted on the substrate 340 using the solder 347.

Figure 23:
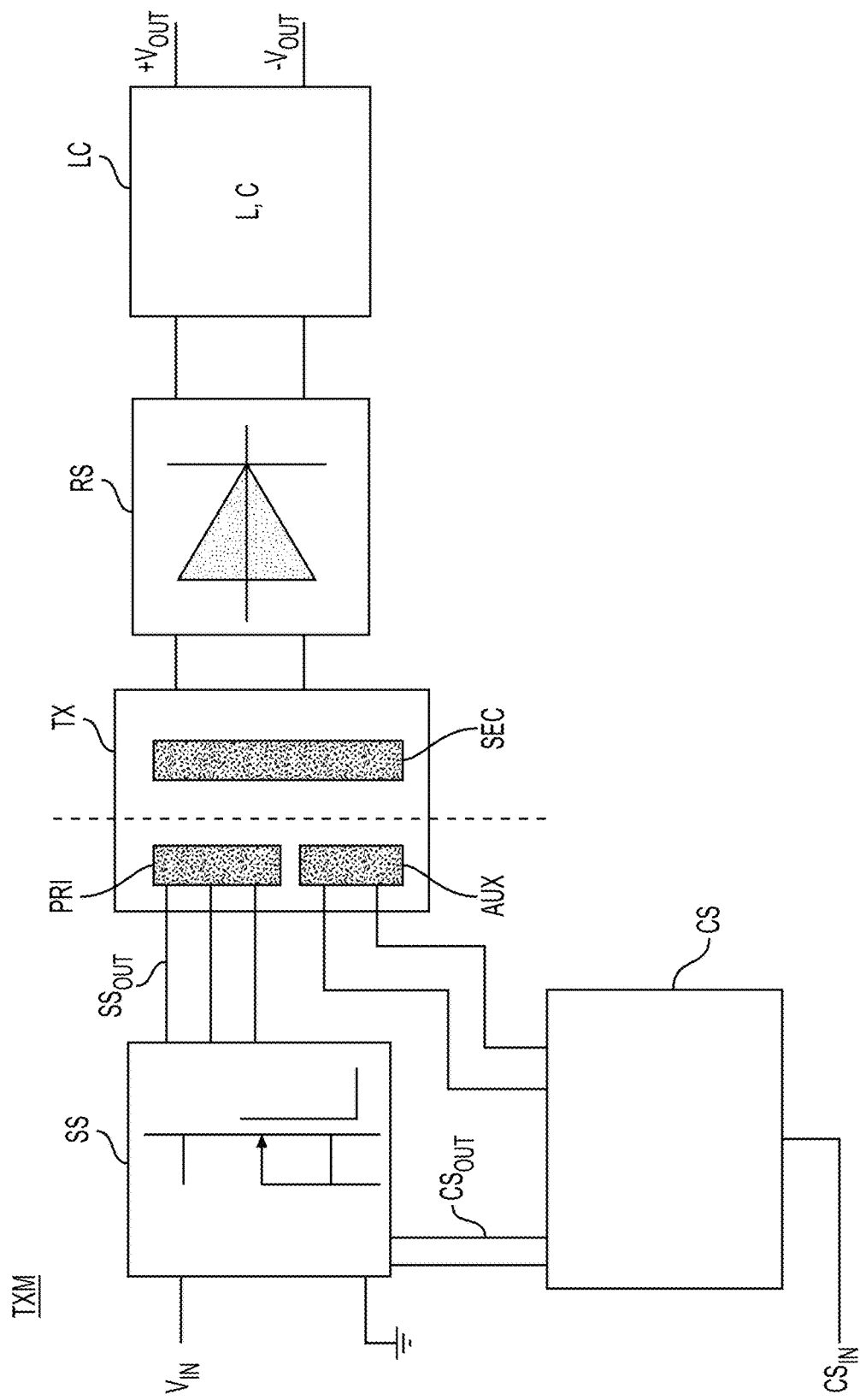
FIG. 23 is a block diagram of an example of an implementation of a magnetic-component module.

FIG. 23 is a block diagram of an example of an implementation of a magnetic-component module TXM. In FIG. 23, the magnetic-component module TXM is implemented as an isolated converter with the dashed line through the transformer TX showing the isolation boundary. The primary side that is on the left side of FIG. 23 and that is connected to the primary winding PR is isolated from the secondary side that is on the right side of FIG. 23 and that is connected to the secondary winding SEC. For example, FIG. 23 shows that the electronic module TXM can include a switching stage SS, a control stage CS, a transformer TX, a rectifier stage RS, and an output filter LC. The transformer TX can include the core and windings that are defined by wire bonds and traces as previously described. The circuitry and components other than the transformer TX can include other electronic components that are attached to the substrate or PCB on which the transformer TX is mounted, as previously described.

As shown in FIG. 23, the switching stage SS receives an input voltage Vin and outputs a voltage SSout to at least one primary winding PRI of the transformer TX. The switching stage can include switches or transistors that control the flow of power. The control stage CS includes an input control signal CSin. The control stage CS can control the switching of the switches in the switching stage SS and can monitor the transformer TX via an auxiliary winding AUX. The dotted vertical line through the transformer TX represents the galvanic isolation between the primary winding PRI and the auxiliary winding AUX from the secondary winding SEC. The secondary winding of the transformer TX can be connected to a rectifier stage RS that in turn is connected to an output filter LC that outputs a DC voltage between +Vout and −Vout. The rectifier stage can include diodes and/or synchronous rectifiers that rectify the voltage at the secondary winding SEC. The output filter LC can include an arrangement of inductor(s) and capacitor(s) to filter unwanted frequencies.

Figure 24:
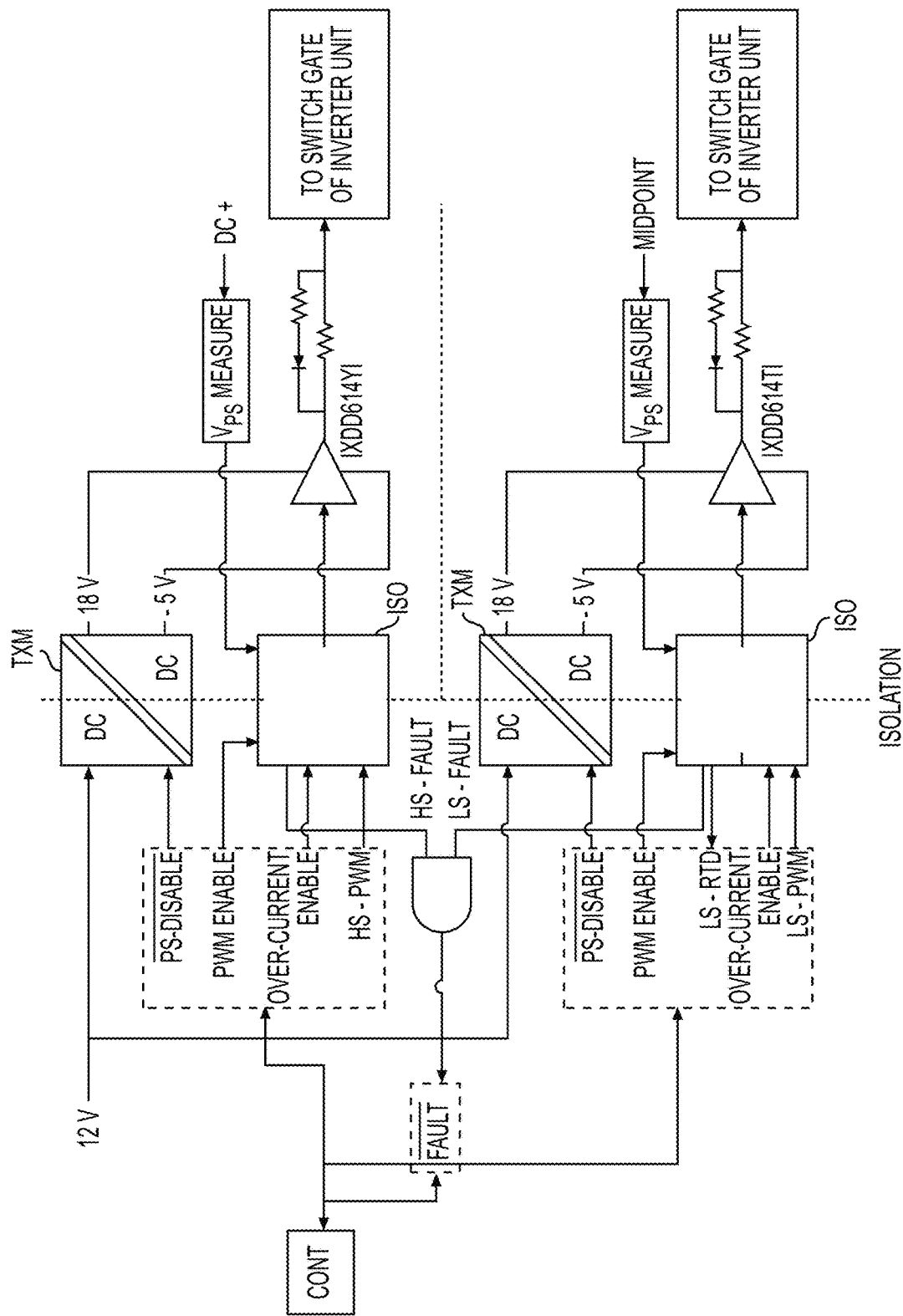
FIG. 24 is a block diagram of a gate-drive-circuit application including a magnetic-component module TXM shown in FIG. 23.

FIG. 24 is a block diagram of a gate-drive-circuit application that can include one or more of the magnetic-component modules TXM shown in FIG. 23. The vertical and horizontal dotted lines represent galvanic isolation. FIG. 24 shows that the magnetic-component modules TXM can include, for example, a +12 Vdc input and −5 Vdc and +18 Vdc outputs, which could be used, for example, to drive metal-oxide-semiconductor field-effect transistor (MOSFETs) or insulated-gate bipolar transistors (IGBTs). The outputs of the magnetic-component modules TXM can be connected to gate driver IXDD614YI. A controller CONT can transmit and receive control signals represented by those control signals shown in the dotted-line boxes, including, for example, power-supply disable, pulse-width modulation PWM enable, low-side and high-side PWM, over-current detection, etc. The control signals can be transmitted and received between the controller CONT and the isolation circuitry ISO and between the controller CONT and the magnetic-component modules TXM. The isolation circuitry ISO can receive and transmit feedback signals $V_{DS}$ Measure. The isolation circuitry can include a transformer, a capacitor, an opto-coupler, a digital isolator, and the like. The output of the gate drive circuit can be connected to a gate of a switch located in an inverter-unit circuitry as a portion of an inverter for a motor control application as shown in FIG. 25.

Figure 25:
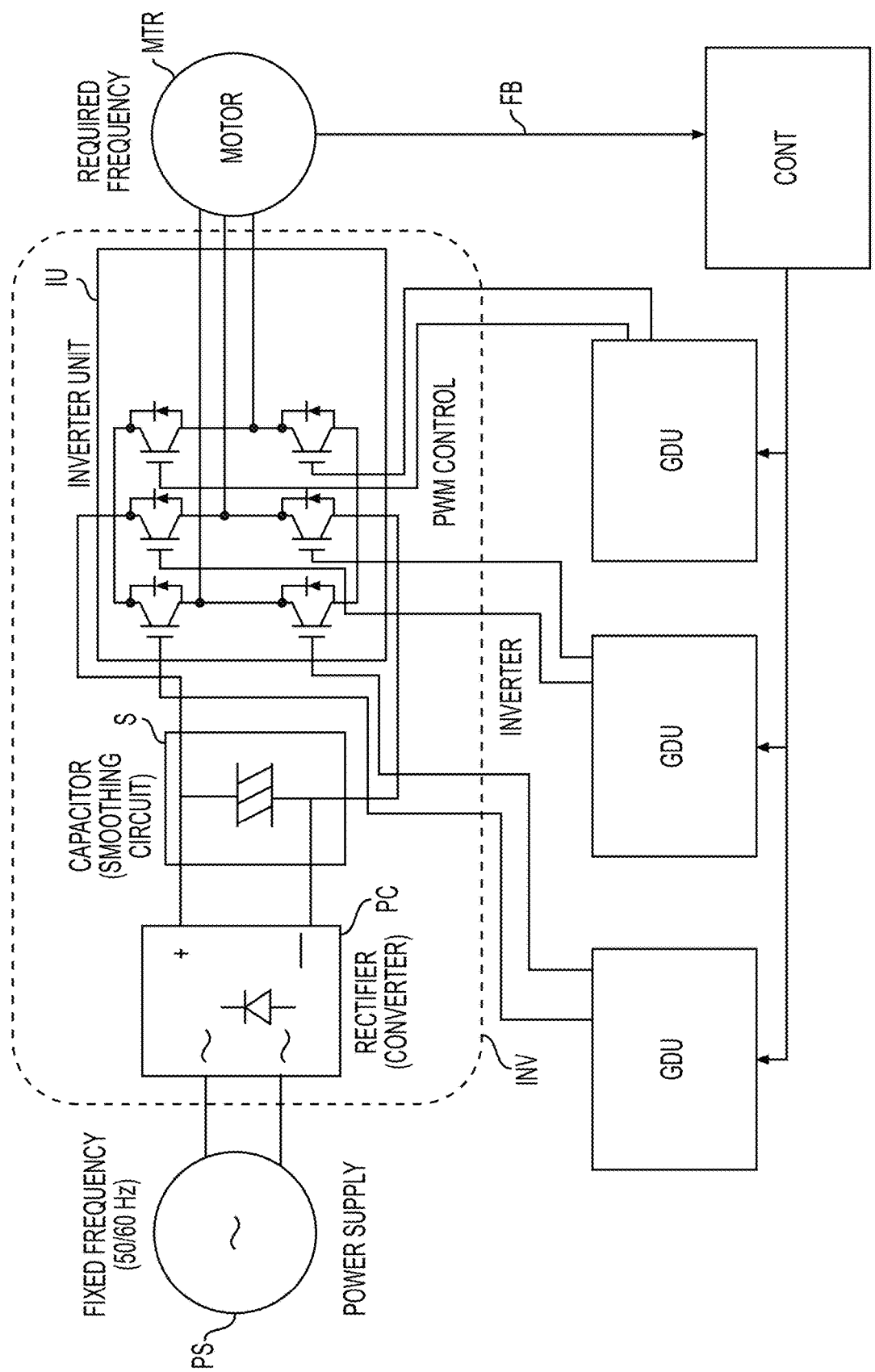
FIG. 25 shows circuitry for a motor control application.

FIG. 25 shows circuitry for a motor control application that can include a power supply PS running at a fixed frequency of 50 Hz or 60 Hz, for example, an inverter INV, and a motor MTR running at its required frequency. As shown, the inverter INV can include a power converter PC, a smoothing circuit S, and inverter unit circuitry IU controlled with PWM control. FIG. 25 shows that a controller CONT can be included to control the gate drive units GDU of FIG. 24. The gate drive units GDU can control the gates of the switches within the inverter unit circuitry IU. Feedback FB can be provided to the controller CONT from the motor MTR to stabilize control of the gate drive units GDU.

A package including the magnetic-component module can be any size. For example, the package can be about 12.7 mm by about 10.4 mm by about 4.36 mm. A package with these dimensions can provide higher isolation. The magnetic-component module can be used in many different applications, including, for example, industrial, medical, and automotive applications. For example, as explained above, the magnetic-component module can be included in a gate drive. The magnetic-component module can provide 1 W-2 W of power with an efficiency of greater than 80% and can provide 3 kV or 5 kV breakdown rating depending on the footprint of the magnetic-component module, for example. The magnetic-component module can include UL-required reinforced isolation and can operate at temperatures between about −40° C. and about 105° C. or between about −40° C. and about 125° C., for example. The magnetic-component module can have a moisture sensitivity level (MSL) of 1 or 2, for example, depending on the application. The magnetic component module can be used in battery management systems or programmable logic controller and data acquisition and communication compliant with RS484/232.

If the magnetic-component module includes a transformer, then, for example, the primary winding can include at least 20 turns and the secondary winding can include 12 turns. The coupling factor of the transformer can be 0.99, for example. The primary windings can have a direct-current resistance (DCR) of about 17.8 Ω/turn, and the secondary windings can have DCR of about 16.9 Ω/turn, for example. The maximum current can be 600 mA (over-current protection) with typical current being 300 mA, for example, to ensure that the magnetic-component module is not damaged in such over-current situations. The core can have an inner diameter of about 5.4 mm, an outer diameter of about 8.8 mm, and a height of about 1.97 mm, for example. The spacer can have an inner diameter of about 5.1 mm, an outer diameter of about 8.8 mm, and a height of about 0.2 mm, for example. The transformer can have size of about 12.7 mm by about 10.4 mm by about 2.5 mm, for example. The core can be made of any suitable material, including, for example, Mn—Zn, Ni—Zn, FeNi, and the like. The spacer can be made of any suitable material, including, for example, an epoxy adhesive. The wire bonds can be made of any suitable material, including, for example, Al or Cu. The pins can be made of any suitable material, including, for example, Cu with Ni—Sn coating. The overmold material can be made of any suitable material, including, for example, epoxy resin.

It should be understood that the foregoing description is only illustrative of the present invention. Various alternatives and modifications can be devised by those skilled in the art without departing from the present invention. Accordingly, the present invention is intended to embrace all such alternatives, modifications, and variances that fall within the scope of the appended claims.

What is claimed is:

1. A magnetic-component module comprising:
   a substrate;
   a header on the substrate and including first and second vias;
   a core;
   a winding including a trace located on the header such that the trace extends through the first and the second vias and around the core; and
   an overmold material encapsulating the header, the core, and the first-trace.

2. The magnetic-component module according to claim 1, further comprising a first wire bond electrically connected to the header and the substrate.

3. The magnetic-component module according to claim 2, further comprising a second wire bond extending over the core and electrically connecting a first portion of the substrate and a second portion of the substrate.

4. The magnetic-component module according to claim 1, wherein a first pad of the header is electrically connected to the substrate.

5. The magnetic-component module according to claim 4, wherein a second pad of the header can be connected to a host substrate.

6. The magnetic-component module according to claim 1, wherein electrical components are attached to a second surface of the substrate that is opposite to a first surface of the substrate that includes the header.

7. The magnetic-component module according to claim 1, wherein the header includes a surface mount pad that extends between the header and the substrate.

8. A voltage converter circuit comprising the magnetic-component module according to claim 1.

9. A gate drive switching circuit comprising the voltage converter circuit of claim 8.

10. A motor control circuit comprising the gate drive switching circuit of claim 9.

11. The magnetic-component module according to claim 1, wherein the trace is a plated trace or a deposited trace on the header.

* * * * *